US011895112B2

(12) United States Patent
Gorski et al.

(10) Patent No.: US 11,895,112 B2
(45) Date of Patent: Feb. 6, 2024

(54) SECURE AUTHENTICATION AND EXECUTION OF APPLICATIONS ON SHARED DEVICES

(71) Applicant: Xerox Corporation, Norwalk, CT (US)

(72) Inventors: James P. Gorski, Penfield, NY (US); Donald L. Wegeng, Fairport, NY (US); Emily Katherine Anzalone, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 339 days.

(21) Appl. No.: 17/479,941

(22) Filed: Sep. 20, 2021

(65) Prior Publication Data

US 2023/0102858 A1    Mar. 30, 2023

(51) Int. Cl.
*H04L 9/40* (2022.01)
*H04L 61/4523* (2022.01)

(52) U.S. Cl.
CPC ...... *H04L 63/0876* (2013.01); *H04L 61/4523* (2022.05); *H04L 63/083* (2013.01); *H04L 63/102* (2013.01)

(58) Field of Classification Search
None
See application file for complete search history.

(56) References Cited

U.S. PATENT DOCUMENTS

2023/0198986 A1* 6/2023 Huang ............... H04L 63/0892
726/4

\* cited by examiner

*Primary Examiner* — Cai Y Chen

(57) ABSTRACT

A method is disclosed. For example, the method executed by a processor of a shared device includes receiving an identification of a user, connecting to a remote server that stores authentication modules and applications, requesting an authentication module and an application stored on the remote server that is associated with the identification of the user, storing the authentication module and the application temporarily on a non-resident memory of the shared device, and executing the application in response to authentication of the user based on log-in information that was received via the authentication module.

20 Claims, 5 Drawing Sheets

SECURE AUTHENTICATION AND EXECUTION OF APPLICATIONS ON SHARED DEVICES

The present disclosure relates generally to computing devices, and relates more particularly to a method and apparatus to securely authenticate and execute applications on shared devices.

BACKGROUND

Office equipment manufacturers are starting to sell value added solutions that provide new services to their office products. In order to access these valued added services, users often must log into the office products. Today these office products have to be uniquely configured to use an employee's specific login method and login parameters.

Co-working spaces are becoming more common. Thus, devices can be shared by multiple different users. Currently, different users may download different applications on a shared device. Each user may log into their respective applications. Configuring the device to be compatible for each application used by each user in the co-working space may be cumbersome or undesirable.

In addition, having different users log into a shared device may create a security issue, as remnants of login information for different users may remain on the shared device. This may allow hackers to access the physical device and possibly steal information from several different users.

SUMMARY

According to aspects illustrated herein, there are provided a method and apparatus for securely authenticating an executing applications on a shared device. One disclosed feature of the embodiments is a method executed by a processor of the shared device. The method comprises receiving an identification of a user, connecting to a remote server that stores authentication modules and applications, requesting an authentication module and an application stored on the remote server that is associated with the identification of the user, storing the authentication module and the application temporarily on a non-resident memory of the shared device, and executing the application in response to authentication of the user based on log-in information that was received via the authentication module.

Another disclosed feature is an apparatus that comprises a processor and a non-transitory computer-readable medium storing a plurality of instructions. The instructions when executed by the processor causes the processor to perform operations comprising receiving an identification of a user, connecting to a remote server that stores authentication modules and applications, requesting an authentication module and an application stored on the remote server that is associated with the identification of the user, storing the authentication module and the application temporarily on a non-resident memory of the shared device, and executing the application in response to authentication of the user based on log-in information that was received via the authentication module.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
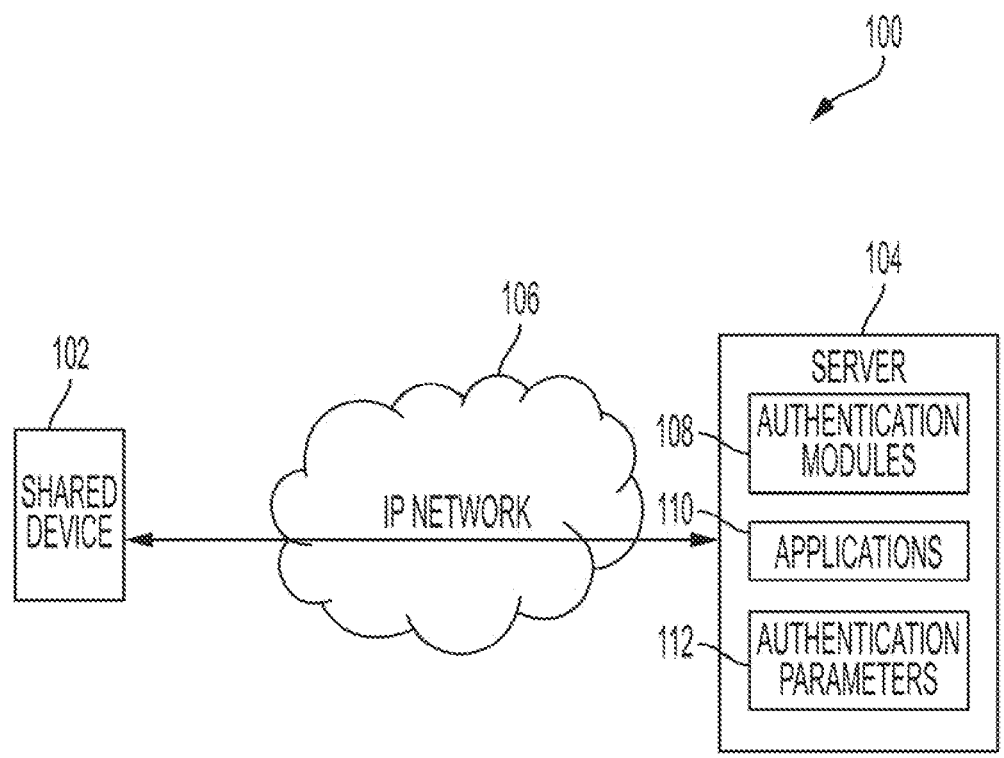
FIG. 1 illustrates a block diagram of an example network of the present disclosure.

The present disclosure broadly discloses a method and apparatus for securely authenticating and executing applications on a shared device. As discussed above, co-working spaces are becoming more common. Thus, devices can be shared by multiple different users. Currently, different users may download different applications on a shared device. Each user may log into their respective applications. Configuring the device to be compatible for each application used by each user in the co-working space may be cumbersome or undesirable.

In addition, having different users log into a shared device may create a security issue, as remnants of login information for different users may remain on the shared device. This may allow hackers to access the physical device and possibly steal information from several different users The present disclosure provides secure authentication and execution of applications on a shared device. In one embodiment, the authentication modules, authentication parameters, and applications can be stored off-box or on a remote server. The remote server may be a service provider for applications on the shared device.

The user may provide identification information to the shared device. The authentication module associated with the identification of the user may then be provided to the shared device. The user may log into the authentication module to access the applications from the remote server. The login information may be verified against the authentication parameters, and the application may be provided to the shared device.

In one embodiment, the authentication module and the applications may be temporarily stored in non-resident memory (e.g., random access memory (RAM), a temporary cache, and the like). Once the user logs out of the application or the shared device, the authentication module and applications may be deleted from the non-resident memory.

As a result, no traces of the type of authentication, authentication information, or user information associated with the applications may remain on the shared device. This may prevent hackers from obtaining sensitive information about the user or any other user who uses the shared device.

In addition, storing the authentication module and applications on the remote server may allow simpler deployment of the shared device, more efficient scalability, and easier updates. For example, each shared device does not have to be configured to work with each type of authentication for different applications and/or services. Rather, the appropriate authentication module may be transmitted to the shared device based on the identification of the user who is currently accessing the shared device.

To deploy additional applications or new authentication procedures, the new applications and/or procedures can be added once to the remote server. In other words, the new application and/or authentication modules do not need to be added to each shared device.

Lastly, any updates or changes to the applications can be easily made by making the change a single time on the remote server. In other words, an information technology (IT) employee does not have to access all of the shared devices to perform updates to the various copies of the application and/or authentication module. Thus, the shared devices may always receive the most updated authentication modules and/or applications.

FIG. 1 illustrates an example network 100 of the present disclosure. In one embodiment, the network 100 may include a shared device 102, a server 104, and an Internet protocol (IP) network 106. The IP network 106 may be any type of IP network that can transport data packets. The IP network 106 has been simplified for ease of explanation and may include additional network elements that are not shown. For example, the IP network 106 may include gateways, switches, firewalls, border elements, routers, additional access networks (e.g., cellular access networks, broadband access networks, etc.), and the like. The IP network 106 may be managed and operated by a communication service provider.

In one embodiment, the shared device 102 may be a computing device at a co-working location or at a shared office space. For example, the shared device 102 may be a desktop computer, a laptop computer, a tablet computer, a multi-function device (MFD) and the like. The co-working location may be a shared office space where multiple different users have access to the same device (e.g., the shared device 102). Different users may want access to different applications. However, each application may request different types of authentication.

Attempting to configure the shared device 102 to accommodate all of the different users' login methods and to configure the shared device 102 to use all of the different applications may be inefficient and cumbersome. In addition, all of the different users' login information could potentially be stored on the shared device 102. This may make the shared device 102 an attractive target for hackers.

The present disclosure stores all of the authentication artifacts and applications off-box on the server 104. The server 104 may be a remote server that is located remotely from the shared device 102. The server 104 may be a computing device with a large amount of storage or multiple storage devices/databases.

In one embodiment, the server 104 may store authentication modules 108, applications 110, and application parameters 112. In one embodiment, the application parameters 112 may be combined with or be part of the authentication modules 108. Thus, reference to the authentication modules 108 may include the application parameters 112.

In one embodiment, the authentication modules 108 may be instructions executed by a processor of the shared device 102 to gather login information for a particular user to access a particular application 110. Different applications may use different types of authentication protocols. For example, a first authentication module 108 may use Kerberos for a first application 110. A second authentication module 108 may use a lightweight directory access protocol (LDAP) for a second application 110, and so forth.

In one embodiment, the authentication parameters 112 may provide parameters for a specific service of the application 110. For example, the authentication parameters may include a hostname, a universal resource locator (URL), a realm, and the like.

The applications 110 may be different types of applications that can be executed on the shared device. The applications 110 may include productivity applications such as a word processing application, a spreadsheet application, a database application, a presentation application, and the like. The applications 110 may include entertainment applications that provide streaming services. The applications 110 may include video game applications. In other words, the applications 110 may be any type of application that may use a subscription service that requires login/authentication of a user.

In one embodiment, a user may provide identification information on the shared device 102. For example, the identification information may be an email, an email extension (or an enterprise associated with the email extension), or a user name of the user. The shared device 102 may establish a connection to the server 104 via the IP network 106. The shared device 102 may then obtain the authentication modules 108, applications 110, and the authentication parameters 112 associated with the identification information that was received.

In one embodiment, the user may pre-define which applications 110 the user wants to use on the shared device 102. For example, the user may establish a user account with the server 104 to select which applications 110 to obtain whenever the user accesses the shared device 102. Thus, each user may have a customized selection of applications 110. The authentication modules 108 and the authentication parameters 112 associated with the selected applications 110 may be sent to the shared device 102 in response to receiving the identification information of the user.

In one embodiment, a group of applications 110 may be associated with an email extension as a default. For example, email addresses that have an @gmail extension may be associated with a default group of applications 110. Email addresses that have an @yahoo extension may be associated with a different default group of applications. Email addresses that have an @abccorp extension may be associated with yet another different default group of applications (e.g., a suite of default applications associated with an enterprise associated with the @abcorp email extension). Thus, the authentication modules 108 and the authentication parameters 112 associated with the applications 110 for a particular email extension may be sent to the shared device.

In one embodiment, the authentication modules 108, the applications 110, and the authentication parameters 112 may be sent over the IP network 106 via a secure connection (e.g., a hypertext transfer protocol secure (HTTPS) connection). In one embodiment, the authentication modules 108, the applications 110, and the authentication parameters 112 may be encrypted. The shared device 102 may have an encryption key locally that can be used to decrypt the encryption.

After the authentication modules 108, the applications 110, and the authentication parameters 112 are received, the shared device 102 may temporarily store the authentication modules 108, the applications 110, and the authentication parameters 112 in a non-resident memory of the shared device 102. The user may provide login information to the authentication module 108 to be authenticated. After authentication, an application 110 may be executed from the non-resident memory. After the user logs out, or after a non-activity timer has expired to automatically log the user out, the authentication modules 108, the applications 110, and the authentication parameters 112 may be deleted from the non-resident memory. Thus, no traces of any authentication artifacts and no information related to what types of applications 110 were used may be left on the shared device.

Figure 2:
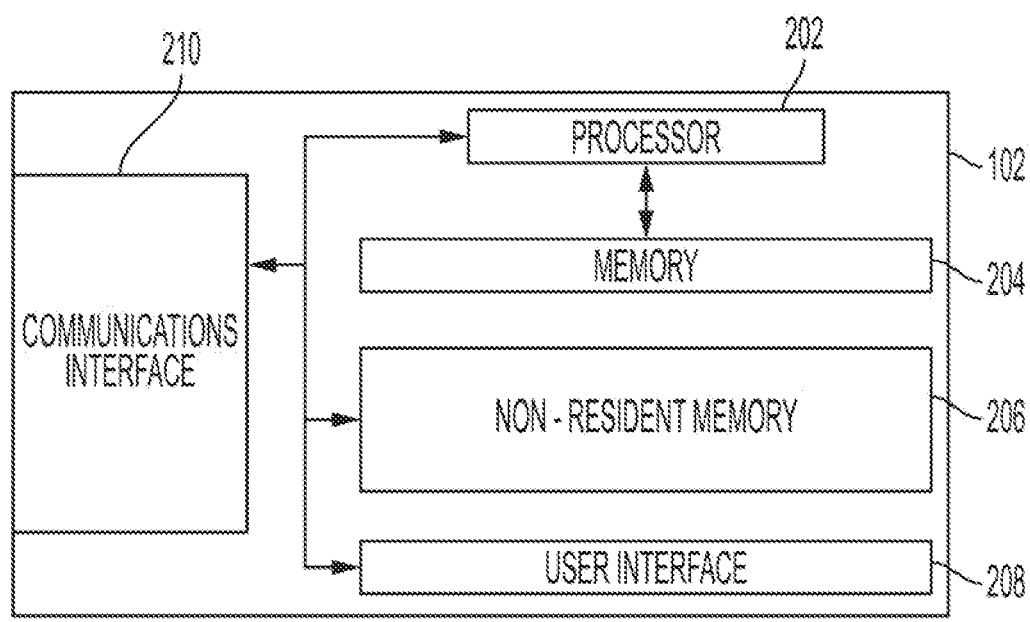
FIG. 2 illustrates a block diagram of an example shared device before a user logs into the shared device and after a user logs out of the shared device in accordance with the present disclosure.
Figure 3:
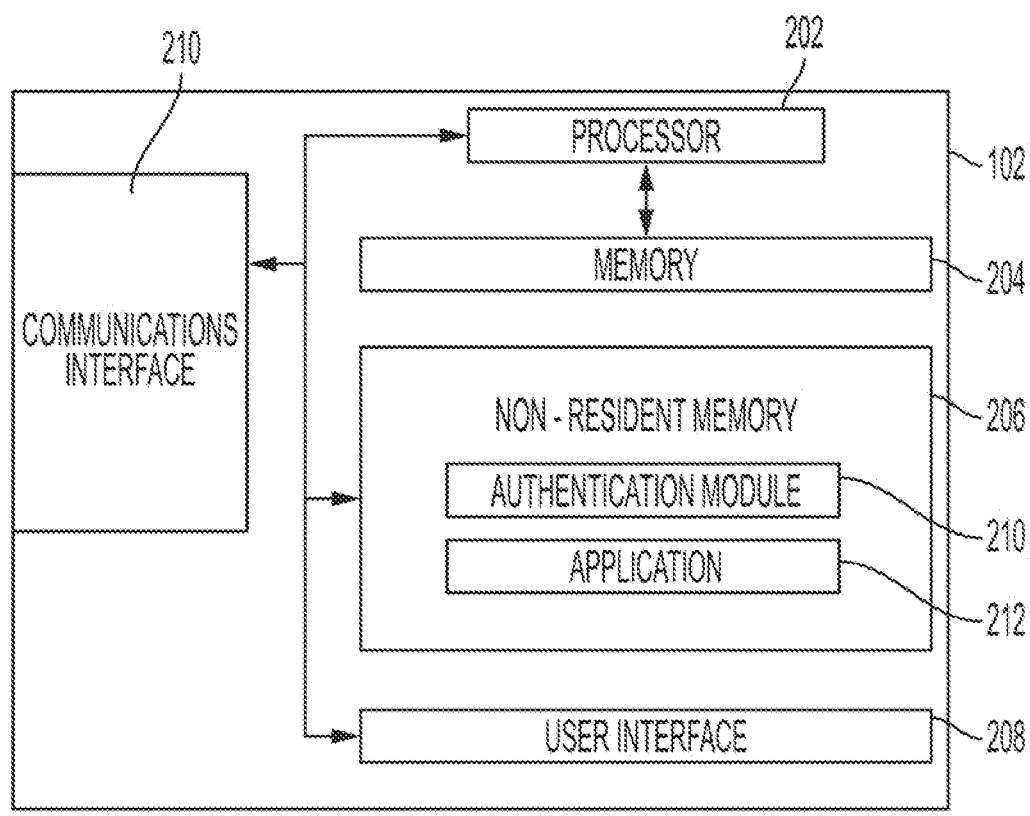
FIG. 3 illustrates a block diagram of an example shared device after the user logs into the shared device in accordance with the present disclosure.

FIGS. 2 and 3 illustrate block diagrams of the shared device 102. FIG. 2 illustrates a state of the shared device 102 before and after a user logs into the shared device 102. FIG. 3 illustrates a state of the shared device 102 after the user has logged into the shared device 102, but before the user has logged out of the shared device 102.

Referring to FIG. 2, the shared device 102 may include a processor 202, a memory 204, a non-resident memory 206, a user interface 208, and a communications interface 210. The processor 202 may be communicatively coupled to the memory 204, the non-resident memory 206, the user interface 208, and the communications interface 210.

In one embodiment, the communications interface 210 may be a wired or wireless interface. For example, the communications interface 210 may be a wired Ethernet connection interface, a wireless Wi-Fi radio, and the like. The processor 202 may receive the authentication modules 108, the applications 110, and the authentication parameters 112 via the communications interface 210 over the IP network 106, as described above.

In one embodiment, the user interface 208 may include input and output devices. For example, the user interface 208 may include a touchscreen display that presents a graphical user interface (GUI). In another example, the user interface 208 may include a display to present a GUI and external input devices such as a mouse and a keyboard.

The memory 204 may be the main memory of the shared device 102. For example, the memory 204 may be any non-transitory computer readable medium that may store instructions executed by the processor. The memory 204 may be a hard-disk drive, a solid-state drive, and the like.

The non-resident memory 206 may be a temporary storage memory. For example, the non-resident memory 206 may be a random access memory (RAM). In another example, the non-resident memory 206 may be a temporary memory cache or a partition of the memory 204 that is automatically deleted when the user logs out of the shared device 102.

It should be noted that the shared device 102 has been simplified for ease of explanation and may include other components that are not shown. For example, the shared device 102 may have a power supply, a dedicated or integrated graphics processor, additional interfaces (e.g., universal serial bus (USB) interfaces), and the like.

As shown in FIG. 2, before a user logs into the shared device 102, the non-resident memory 206 is empty. In one embodiment, "empty" may refer to the fact that the non-resident memory 206 does not have any of the authentication modules 108, the applications 110, or the authentication parameters 112 stored.

At some point in time, a user may log into the shared device 102. For example, the user may provide identification information via the user interface 208. The identification information may be an email or a username. In one embodiment, the user may also provide a local password with the identification information to log into the shared device 102. In response, the shared device 102 may establish a secure connection over the IP network 106 to the server 104.

The server 104 may receive the identification information and determine which authentication modules 108, applications 110, and/or authentication parameters 112 should be sent to the shared device 102 based on the identification information. The selected authentication modules 108, applications 110, and authentication parameters 112 may then be transmitted to the shared device 102.

FIG. 3 illustrates the shared device 102 after the user has logged into the shared device 102 and a selected authentication module 210 and a selected application 212 are received, but before the user has logged out of the shared device 102. As noted above, the authentication module 210 may include the associated authentication parameters and is shown as a single module 210.

In one embodiment, the selected authentication module 210 and the selected application 212 may be stored in the non-resident memory 206 (e.g., a RAM of the shared device) temporarily. The selected authentication module 210 may be executed from the non-resident memory 206 to receive login information from the user. The login information may be entered via the user interface 208 and then transmitted to the appropriate website for authentication. For example, the website may be contained in the authentication parameters.

After the user is authenticated, the selected application 212 may be authorized to be executed. The selected application 212 may be executed from the non-resident memory 206. The selected application 212 may include configuration data files and executable code to configure the shared device 102 in order to execute the selected application 212.

In one embodiment, the selected authentication module 210 and the selected application 212 may be sent together in an encrypted data package. In another embodiment, the selected authentication module 210 and the selected application 212 may be sent separately. For example, the selected authentication module 210 may be transmitted to the shared device first. After the user logs into the selected authentication module 210 and is authorized, an authorization notification may be sent to the server 104. In response to the authorization notification, the server 104 may transmit the selected application 212 from the available applications 110 to the shared device 102.

After the user is done using the selected application 212, the user may log out of the shared device 102. In another embodiment, the user may be automatically logged out after a no-activity timer has timed out (e.g., 10 minutes, 30 minutes, and the like). After the user is logged out of the shared device 102, the shared device 102 may automatically delete the selected authentication module 210 and the selected application 212 from the non-resident memory 206. Thus, the shared device 102 may return to the state shown in FIG. 2 where the non-resident memory 206 is empty.

As a result, when a second user logs into the shared device 102, the second user may not see any authentication artifacts or have any knowledge of the applications that were used by the previous user. The second user may log into the shared device 102 and obtain a different set of authentication modules and applications from the available authentication modules 108 and applications 110 stored on the server 104. The different set of authentication modules and applications may be temporarily stored in the non-resident memory 206 of the shared device and deleted after the second user logs out. The process may be repeated for each subsequent user that logs into the shared device 102.

Figure 4:
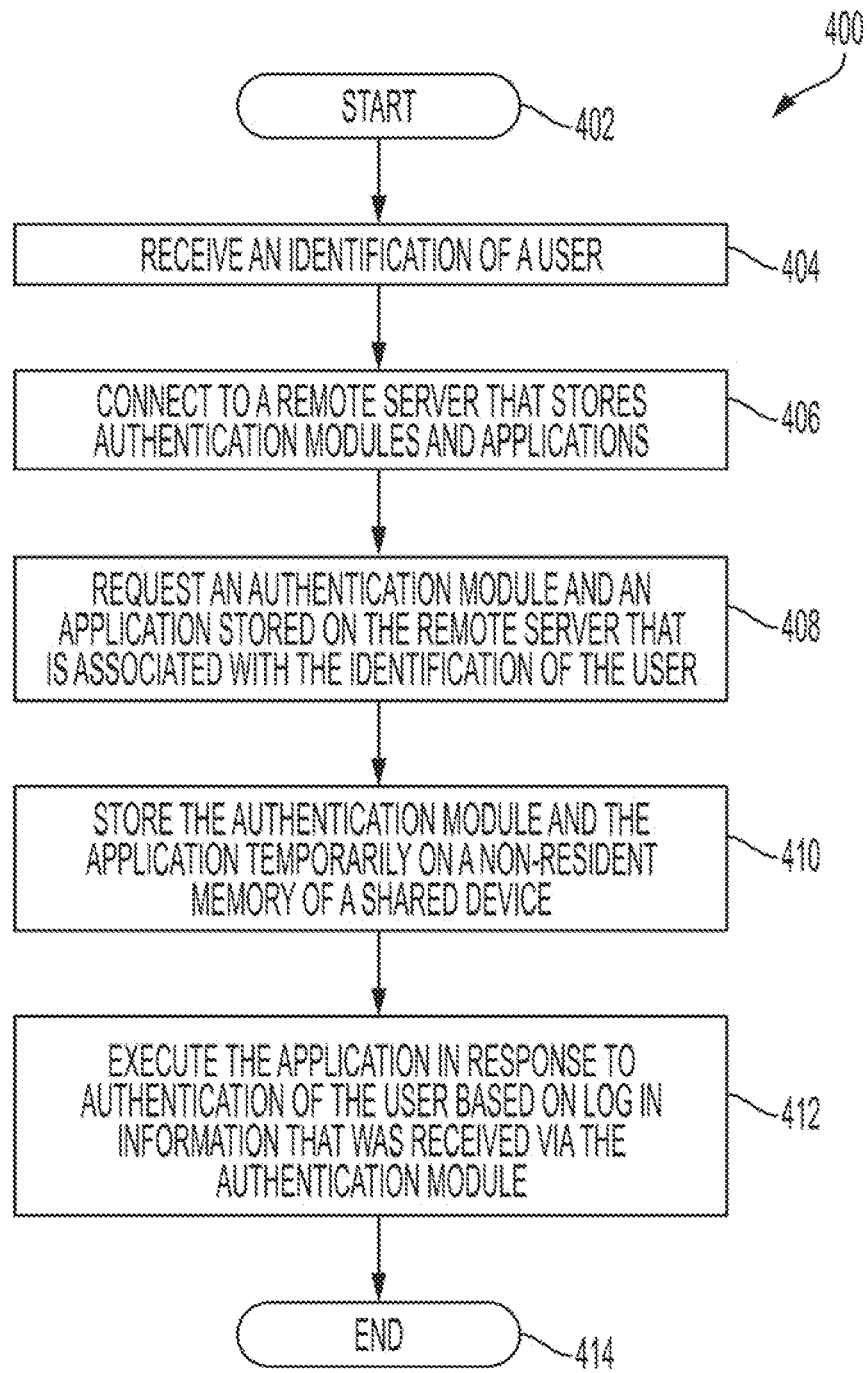
FIG. 4 illustrates a flow chart for a method of securely authenticating an executing applications on a shared device of the present disclosure.

FIG. 4 illustrates a flow chart of an example method 400 for securely authenticating and executing applications on a shared device of the present disclosure. In one embodiment, the method 400 may be performed by the shared device 102 or by an apparatus such as the apparatus 500 illustrated in FIG. 5 and discussed below.

In one embodiment, the method 400 begins at block 402. At block 404, the method 400 receives an identification of a user. For example, the identification of the user may be a username or an email that is entered on a shared device located in a co-working environment or shared office space. The shared device may be accessed by different users in the co-working environment. In one embodiment, a local password may be received with the identification of the user to log into the shared device.

At block 406, the method 400 connects to a remote server that stores authentication modules and applications. For example, in response to receiving the identification, the shared device may connect to the remote server of an IP network. The connection may be a secure connection (e.g., an HTTPS connection).

The server may store different authentication modules and applications associated with different users or groups of users. The authentication modules may include authentication parameters, or the authentication parameters may be stored separately. The authentication modules may use different authentication protocols such as Kerberos, LDAP, and the like.

The applications may be any type of application that uses a subscription service or that requires authentication. The authentication modules may be selected based on the type of authentication that is used by the selected applications.

At block 408, the method 400 requests an authentication module and an application stored on the remote server that is associated with the identification of the user. For example, the authentication module and the application associated with the identification of the user may be customized for each user. In other words, the user may select which applications, and thereby, which associated authentication modules to use. In another embodiment, a default authentication module and application may be associated with a particular identification. For example, the identification may be an email extension, and all users logging in with the same email extension may receive the default authentication module and application when logging into the shared device.

In one embodiment, more than one authentication module and application may be requested. For example, two applications may be requested. One application may use an authentication module for Kerberos authentication and the second application may use an authentication module for LDAP authentication. As a result, both authentication modules may be requested for the two different applications.

In one embodiment, the authentication module and the application that is requested may be transmitted to the shared device. The authentication module and the application may be sent in an encrypted data package. The shared device may have an encryption key to decrypt the encrypted data package.

At block 410, the method 400 stores the authentication module and the application temporarily on a non-resident memory of the shared device. For example, the non-resident memory may be a RAM of the shared device. In other words, the authentication module and the application are not stored in a permanent memory of the shared device (e.g., a hard-disk drive or a solid-state drive that stores the operating system of the shared device).

At block 412, the method 400 executes the application in response to authentication of the user based on login information that was received via the authentication module. For example, the authentication module and the application may be executed from the non-resident memory of the shared device. The authentication module may receive login or authentication credentials information from the user. The login information may be sent to a website of the provider of the application as determined by the authentication parameters.

After the user is authenticated to use the application, the application may be executed from the non-resident memory of the shared device. The application may automatically configure the shared device 102 to execute the application. After the user is finished, the user may log out of the shared device. The authentication module and the application may be deleted from the non-resident memory and the shared device 102 may be ready for another user. At block 414, the method 400 ends.

Figure 5:
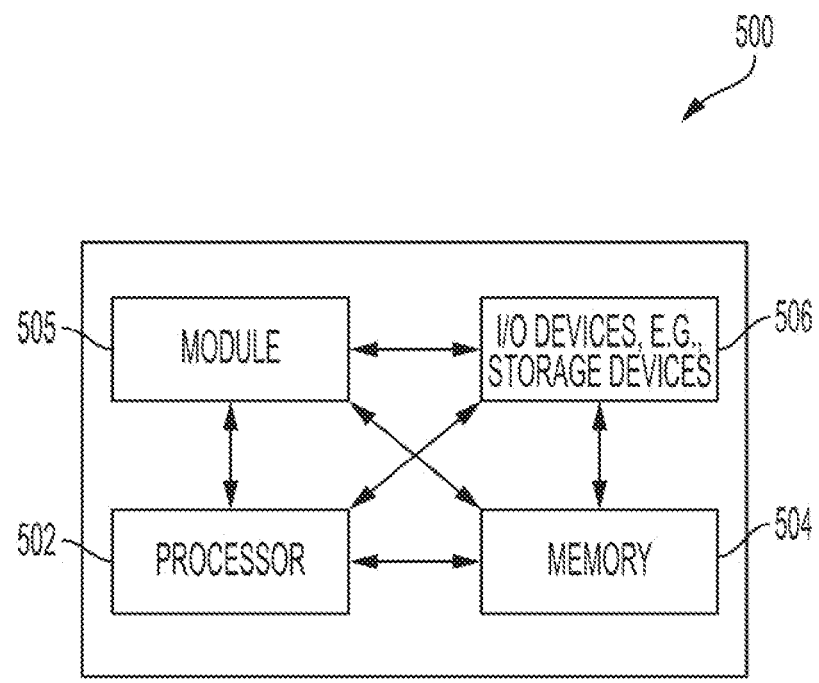
FIG. 5 illustrates a high-level block diagram of an example computer suitable for use in performing the functions described herein.

FIG. 5 depicts a high-level block diagram of a computer that is dedicated to perform the functions described herein. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for securely authenticating an executing applications on a shared device, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for securely authenticating an executing applications on a shared device (e.g., a software program comprising computer-executable instructions) can be loaded into memory 504 and executed by hardware processor element 502 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for securely authenticating an executing applications on a shared device (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
receiving, via a processor of a shared device, an identification of a user;
connecting, via the processor, to a remote server that stores authentication modules and applications;
requesting, via the processor, an authentication module and an application stored on the remote server that are associated with the identification of the user;
storing, via the processor, the authentication module and the application temporarily on a non-resident memory of the shared device; and
executing, via the processor, the application in response to an authentication of the user based on login information that was received via the authentication module.

2. The method of claim 1, further comprising:
detecting, via the processor, a log out of the user; and
deleting, via the processor, the authentication module and the application from the non-resident memory of the shared device.

3. The method of claim 2, further comprising:
receiving, via the processor, a second identification associated with a second user;
connecting, via the processor, to the remote server;
requesting, via the processor, a second authentication module and a second application stored on the remote server that are associated with the second identification of the second user, wherein the second authentication module is different from the authentication module associated with the user;
storing, via the processor, the second authentication module and the second application temporarily on the non-resident memory of the shared device; and
executing, via the processor, the second application in response to an authentication of second login information received via the second authentication module.

4. The method of claim 1, wherein the identification of the user comprises a user name.

5. The method of claim 1, wherein the identification of the user comprises an enterprise associated with an email extension of the identification.

6. The method of claim 1, wherein the non-resident memory comprises a random access memory (RAM) of the shared device.

7. The method of claim 1, wherein the shared device comprises a multi-function device.

8. The method of claim 1, wherein the authentication module comprises a Kerberos authentication or a lightweight directory access protocol (LDAP) authentication.

9. The method of claim 1, wherein the authentication module includes an authentication parameter to provide a hostname or universal resource locator (URL) to an authentication service to provide the login information.

10. The method of claim 1, wherein the application comprises a suite of default applications associated with an enterprise that provides an email used as the identification of the user.

11. The method of claim 1, wherein the application comprises a user selected application associated with the identification of the user.

12. An apparatus, comprising:
a processor; and
a non-transitory computer-readable medium storing a plurality of instructions, which when executed by the processor, causes the processor to perform operations comprising:
receiving an identification of a user;
connecting to a remote server that stores authentication modules and applications;
requesting an authentication module and an application stored on the remote server that are associated with the identification of the user;
storing the authentication module and the application temporarily on a non-resident memory of the shared device; and
executing the application in response to an authentication of the user based on login information that was received via the authentication module.

13. The apparatus of claim 12, wherein the apparatus comprises a multi-function device (MFD).

14. The apparatus of claim 12, wherein the non-resident memory comprises a random access memory (RAM).

15. The apparatus of claim 12, wherein the instructions further cause the processor to perform operations comprising:
detecting a log out of the user; and
deleting the authentication module and the application from the non-resident memory of the shared device.

16. The apparatus of claim 12, wherein the instructions further cause the processor to perform operations comprising:
receiving a second identification associated with a second user;
connecting to the remote server;
requesting a second authentication module and a second application stored on the remote server that are associated with the second identification of the second user, wherein the second authentication module is different from the authentication module associated with the user;
storing the second authentication module and the second application temporarily on the non-resident memory of the shared device; and
executing the second application in response to an authentication of second login information received via the second authentication module.

17. The apparatus of claim 12, wherein the authentication module comprises a Kerberos authentication or a lightweight directory access protocol (LDAP) authentication.

18. The apparatus of claim 12, wherein the authentication module includes an authentication parameter to provide a hostname or universal resource locator (URL) to an authentication service to provide the login information.

19. The apparatus of claim 12, wherein the application comprises a suite of default applications associated with an enterprise that provides an email used as the identification of the user.

20. A method, comprising:
receiving, via a processor of a multi-function device (MFD) in a public location, an email of a user to identify the user;
connecting, via the processor, to a remote server that stores authentication modules and applications;

requesting, via the processor, an authentication module and an application stored on the remote server that are associated with an enterprise of an email extension of the user;
receiving, via the processor, the authentication module;
executing, via the processor, the authentication module from a random access memory (RAM) of the MFD to receive login information for the application;
transmitting, via the processor, the login information to the remote server for authentication;
receiving, via the processor, the application in response to the login information being authenticated by the remote server;
executing, via the processor, the application from the RAM of the MFD;
detecting, via the processor, a log out of the user; and
deleting, via the processor, the authentication module and the application from the RAM of the MFD.

* * * * *